W. S. WILKINSON.
STEERING GEAR.
APPLICATION FILED APR. 26, 1911.
1,155,181.
Patented Sept. 28, 1915.
8 SHEETS—SHEET 1.
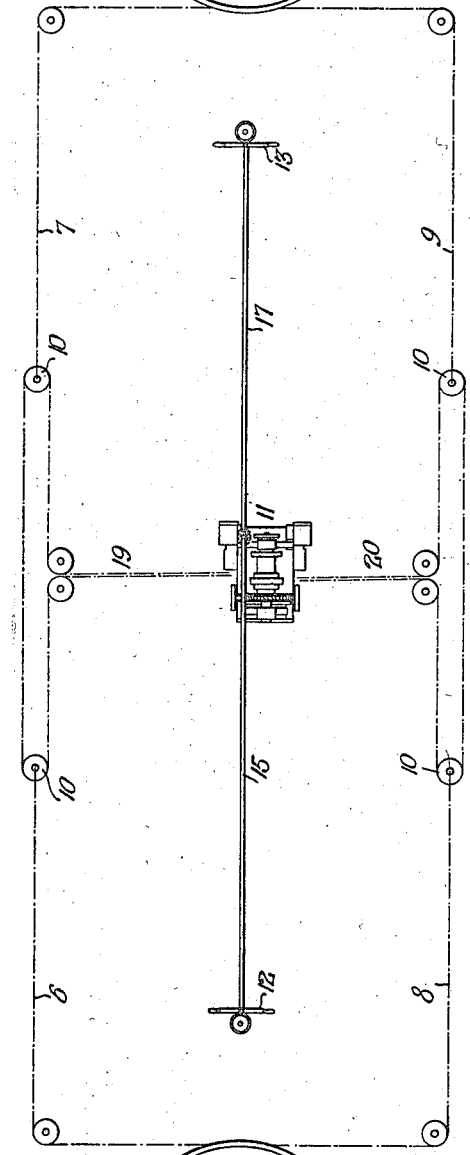
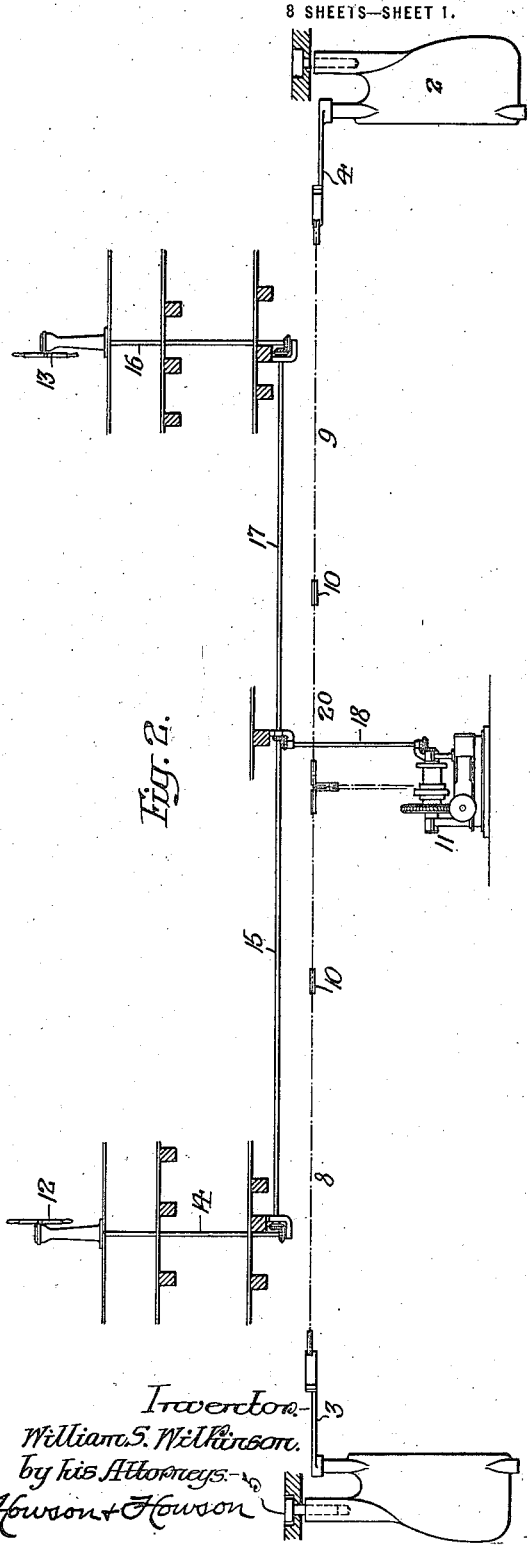
Witnesses—
Inventor—
William S. Wilkinson.
by his Attorneys—
Howson & Howson

W. S. WILKINSON.
STEERING GEAR.
APPLICATION FILED APR. 26, 1911.

1,155,181. Patented Sept. 28, 1915.
8 SHEETS—SHEET 2.

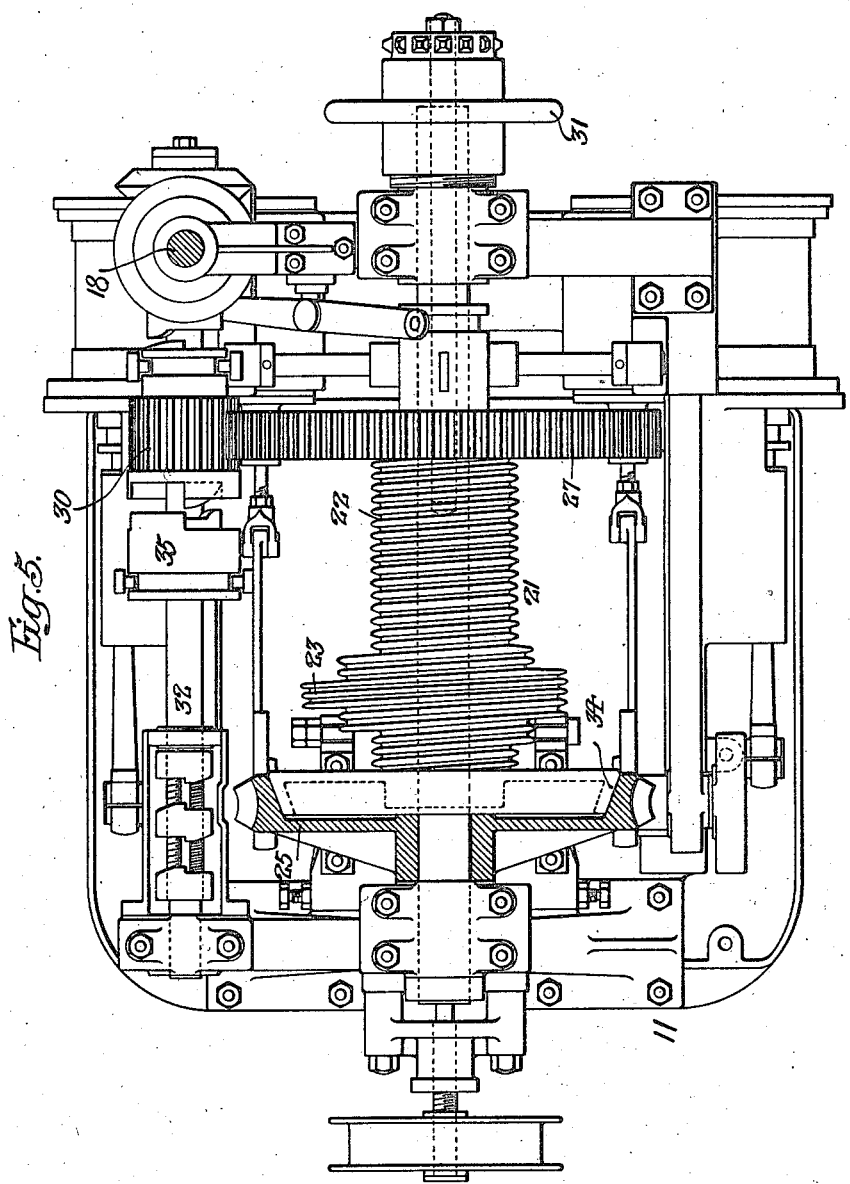

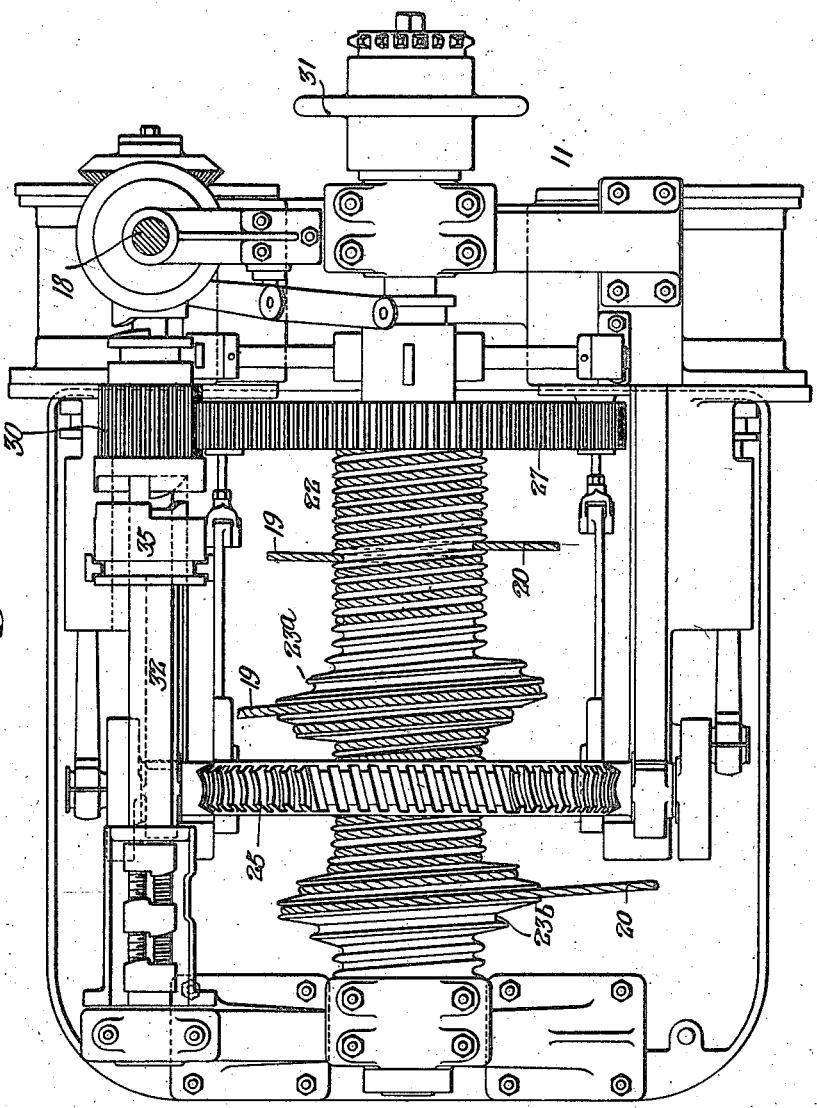

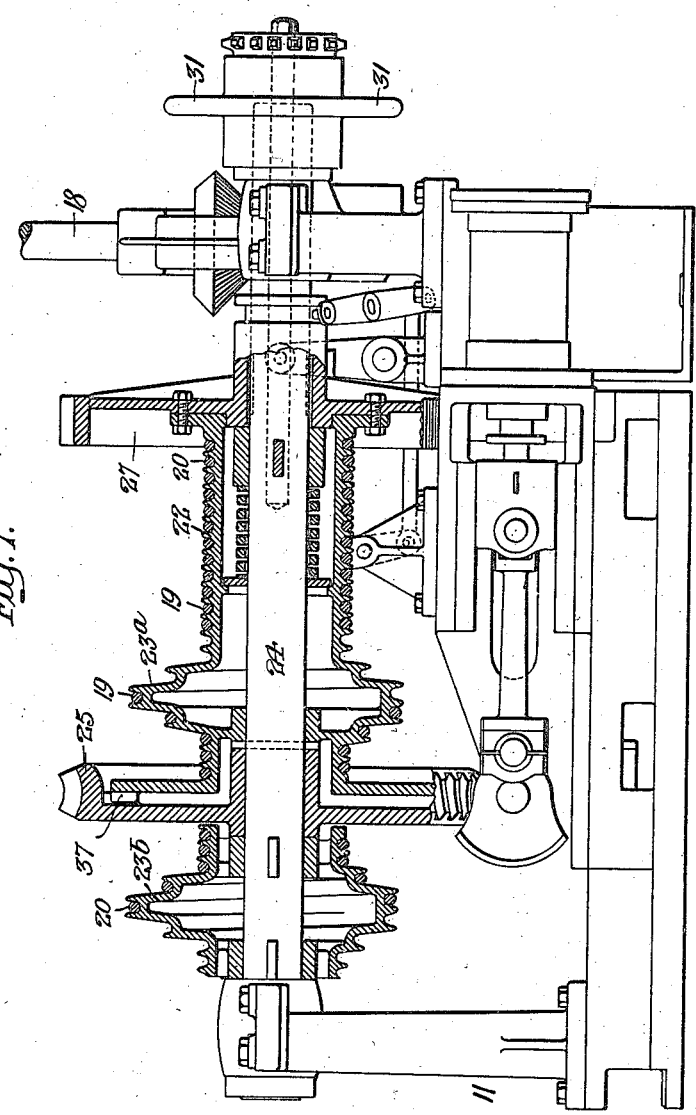

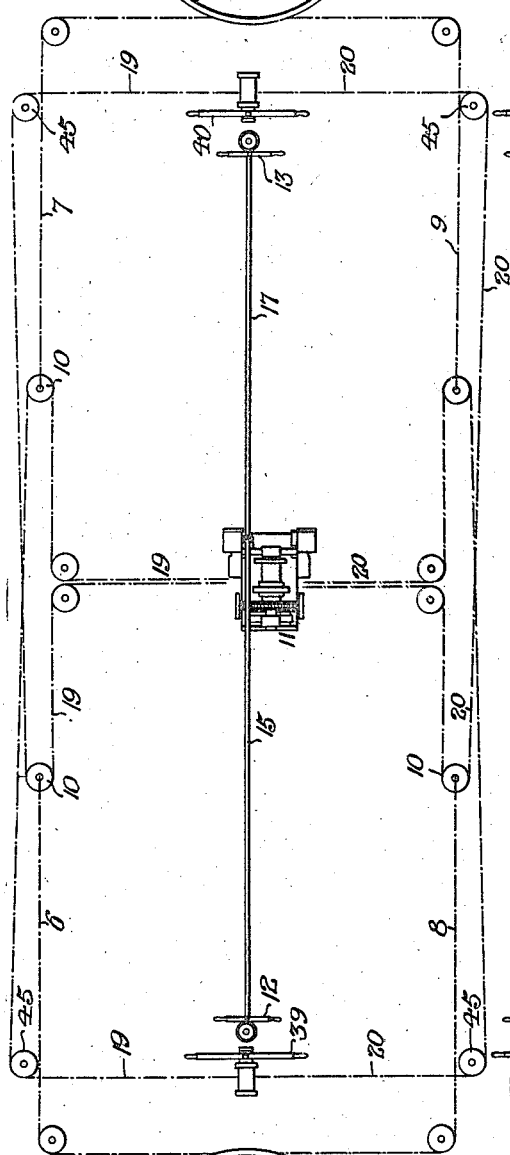
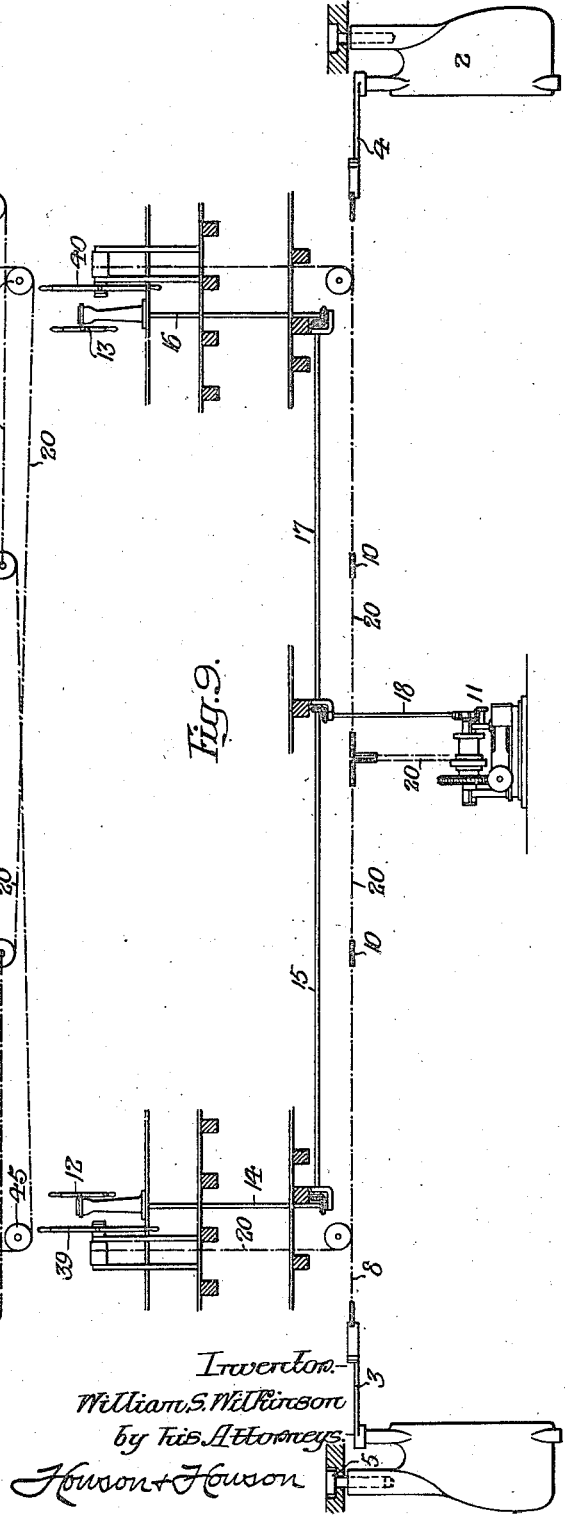

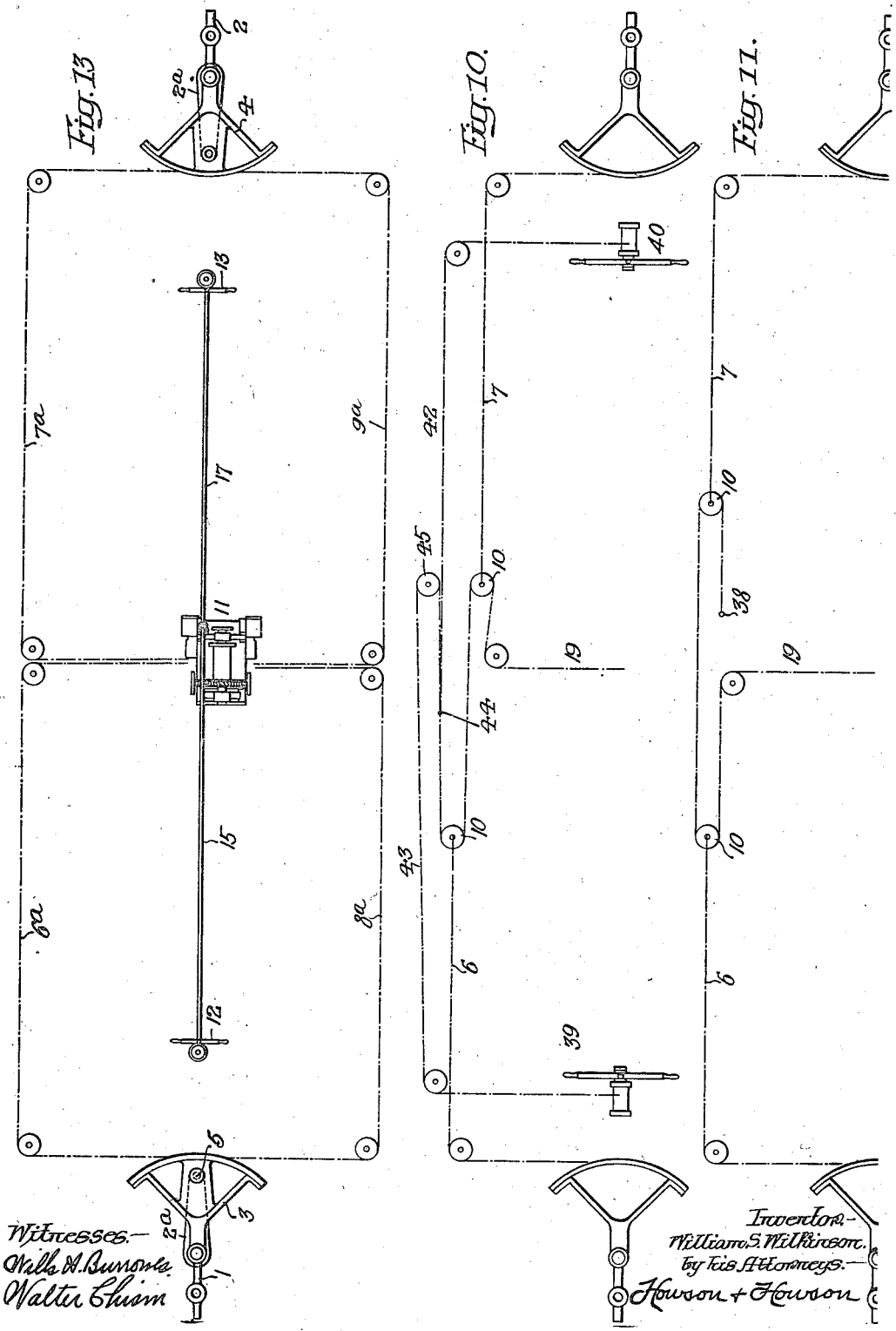

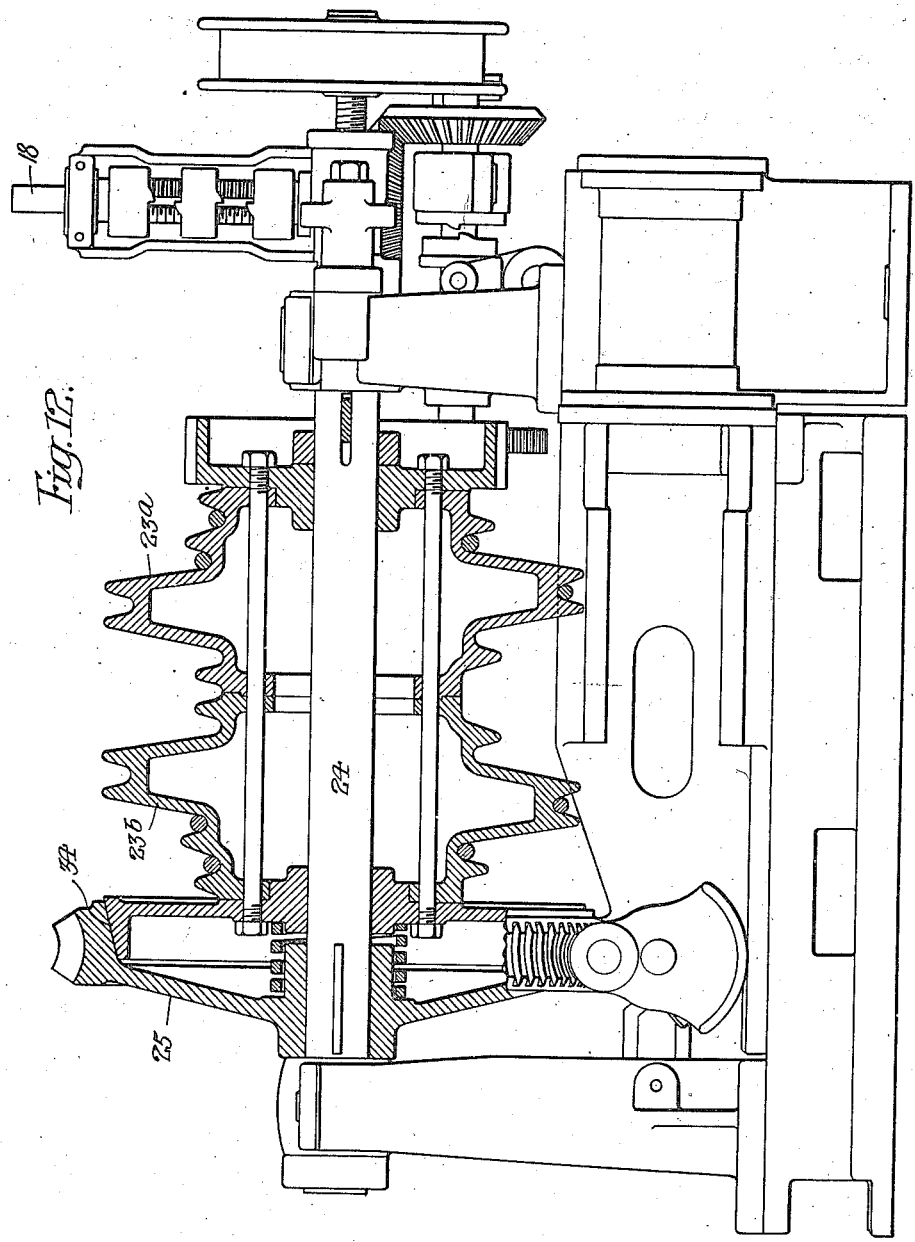

UNITED STATES PATENT OFFICE.

WILLIAM S. WILKINSON, OF FOX CHASE, PENNSYLVANIA, ASSIGNOR TO AMERICAN ENGINEERING COMPANY, A CORPORATION OF PENNSYLVANIA.

STEERING-GEAR.

1,155,181. Specification of Letters Patent. Patented Sept. 28, 1915.

Application filed April 26, 1911. Serial No. 623,440.

*To all whom it may concern:*

Be it known that I, WILLIAM S. WILKINSON, a citizen of the United States, and a resident of Fox Chase, in the county of Philadelphia, State of Pennsylvania, have invented certain Improvements in Steering-Gear, of which the following is a specification.

One object of my invention is to provide a system of apparatus for actuating the rudders of boats and particularly those of the double ended type whereby it shall be possible to increase the leverage on the rudder as it approaches either of its hard over positions from its mid position; it being especially desired that the mechanism for accomplishing this object shall be simple, substantial and reliable under operating conditions.

I further desire to provide a system of apparatus of the above type for actuating one or more rudders which shall be so arranged and constructed that the amount of rope or chain paid out and taken in from the drum shall be such as to avoid any slack rope at any position of the rudder.

I further desire to provide a differentially acting device, preferably a drum, for operating the ropes of a system of steering apparatus whereby it shall be possible to avoid the slacking of any parts of said ropes at any time regardless of the position of the rudders.

A further object of the invention is to provide such an arrangement of rudder operating apparatus that a single engine, controlled from either of two stations, may be used to operate either rudder at will either by the use of a plain cylindrical drum or with a drum of the differential type.

These objects and other advantageous ends I secure as hereinafter set forth, reference being had to the accompanying drawings, in which:—

Figure 4:
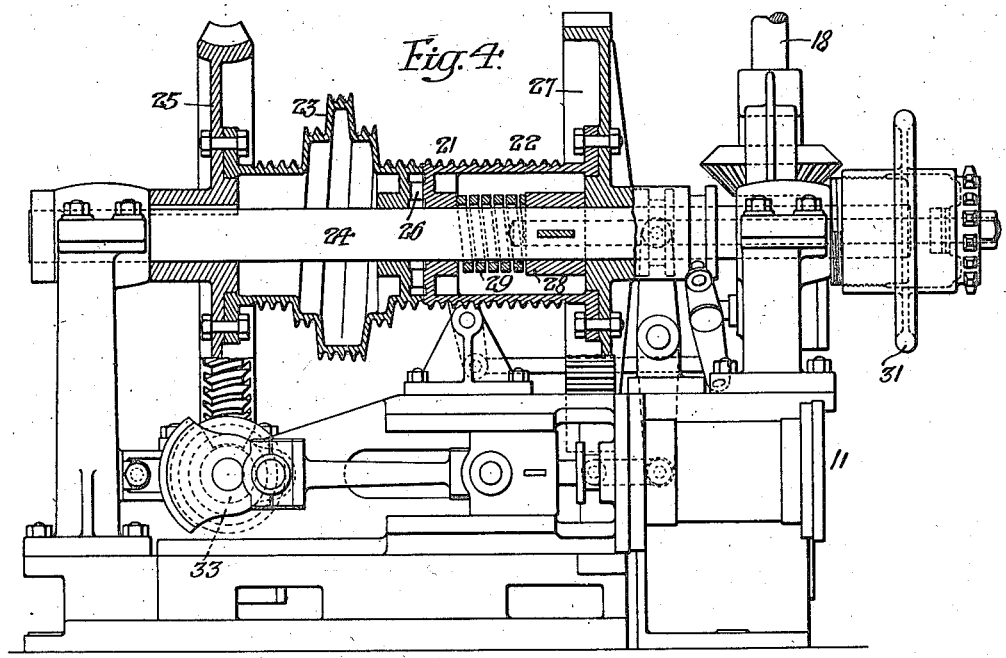
Figure 3:
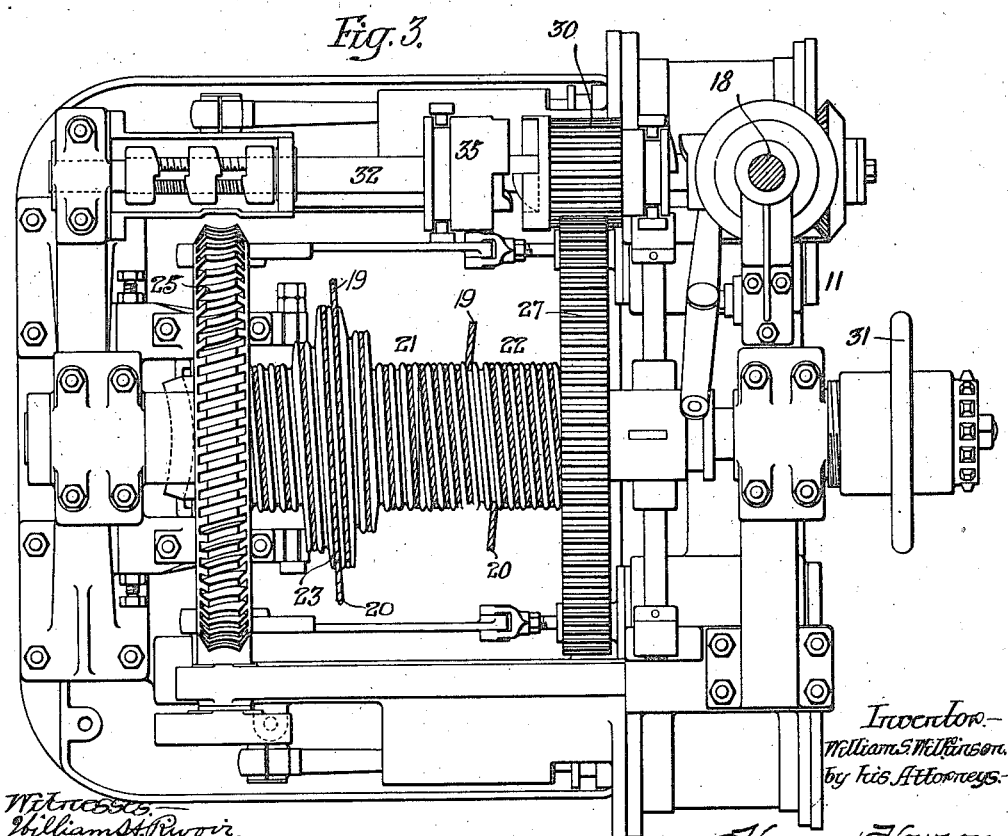

Figure 1, is a diagrammatic plan illustrating my improved steering gear; Fig. 2, is a vertical section of the apparatus illustrated in Fig. 1; Figs. 3 and 4 are respectively a plan and a vertical section of the steering engine used with that form of my invention shown in Figs. 1 and 2, and illustrating the detail construction of the drum and its associated parts; Fig. 5 is a plan, partly in section, illustrating a slightly modified form of the engine shown in Figs. 3 and 4; Figs. 6 and 7 are respectively a plan and a vertical section, illustrating a modified form of drum construction; Figs. 8 and 9 are respectively a plan and a vertical section, showing in diagram a modified arrangement of the steering gear in which the rudder may be actuated by steam mechanism or by a separate hand operated device; Figs. 10 and 11 are fragmentary diagrammatic plans, illustrating the disposition of the ropes or chains arranged according to my invention when the rudders are to be actuated by steam only, with a separate hand gear attachment, or by combined hand and steam actuated means respectively. Fig. 12 is a vertical section of the drum of the steering engine for use in connection with the systems of apparatus shown in Figs. 10 and 11, and Fig. 13, is a diagrammatic plan showing the apparatus employed when steam operated mechanism alone is used for actuating the rudders and in which a plain cylindrical winding drum is employed.

Referring first to Figs. 1 and 2 of the above drawings, 1 and 2 represent the rudders of a double ended vessel such as a ferry boat. Quadrants 3 and 4 are respectively connected to the posts of these two rudders, and either of the latter with its quadrant may be held from moving at will by means of a pin 5 extending through the lower deck of the vessel into a suitable socket at the rear of the rudder. In the particular arrangement of apparatus shown in Figs. 1 and 2 there is connected to the quadrant 3 a pair of ropes 6 and 8 each having at its end a block 10, and similarly the quadrant 4 has connected to it two ropes 7 and 9, each likewise having a block 10 at its end.

At a position preferably at or near the center of the vessel is mounted a steering engine 11, and as the system shown in Figs. 1 and 2 is of the combined hand and steam operated type, I provide at the opposite ends of the vessel two steering wheels 12 and 13 connected through shafts 14, 15, 17, and 16 to a shaft 18 which is capable of being caused to operate either the steam valve of the engine or the cable drum thereof as may be desired.

The drum of the engine as shown in Figs.

3 and 4, is provided with cable or rope grooves as shown and I provide two ropes 19 and 20 operative in these grooves, connecting the ropes 6, 7, 8, and 9 to said drum. The first of these ropes 19 extends from the engine drum around a sheave, thence successively through the two blocks 10 at the ends of the ropes 6 and 7, around a second sheave and back to the drum, while the second rope 20 passes from the drum around a sheave, thence through the blocks 10 connected to the ropes 8 and 9, around a second sheave and back to the drum.

In order to properly operate this peculiar arrangement of parts, I provide the special form of drum 21, Figs. 3 and 4, consisting of a cylindrical part 22 of substantially uniform diameter and a conical part 23; it being noted that each of these portions are twin grooved. The grooves of the part 23, when considered from one end, have a cylindrical portion concentric with the shaft 24 on which the drum is mounted, continuous with which is a spiral part whose distance from the center of the shaft increases at a relatively rapid rate to a maximum and thereafter immediately decreases until it terminates in a second cylindrical portion concentric with the shaft.

The part 23 of the drum is bolted to a worm wheel 25 fixed to the shaft 24 and is detachably connected to the part 22 by clutch teeth 26, while said part is bolted to a gear 27. This gear with said part 22 may be moved longitudinally upon the shaft 24 by means of a collar 28 keyed thereto; there being a spring 29 normally holding the part 22 coupled to the part 23 for a purpose hereafter noted. The gear 27 meshes with a second and smaller gear 30 on the automatic shaft 32 of the engine and it may be connected to or disconnected from the shaft 18 of the steering wheel mechanism by the operation of a suitable hand wheel 31, which through a system of collars and levers may be caused to connect or disconnect said gear 30 and said automatic shaft 32.

The spring 29 is particularly useful in case the hand wheel 31 should be operated to couple the two parts 22 and 23 of the drum, when the teeth 26 of said two parts did not "fair" or intermesh. In such case it would be possible to adjust the hand wheel to its full extent so as to uncouple the gear 30 from the shaft 32, as well as to so compress the spring 29 as to cause it to move the part 22 of the drum to couple it to the part 23 as soon as this latter part had moved sufficiently to permit the clutch teeth 26 to properly engage. This spring has the same functions in that form of my invention shown in Fig. 7 as it has in that illustrated in Fig. 4, in the former case serving to permit operation of the hand wheel at any time regardless of the relative positions of the teeth 37 and causing these to properly mesh as soon as relative movement of one set of them occurs, in case they should not "fair" at the time said hand wheel was operated.

At the same time that the gear 30 is connected to the shaft 32, the collar 28 is so moved as to uncouple the parts 22 and 23 of the drum and since the worm wheel 25 is engaged by the worm 33 on the crank shaft of the engine, it will be noted that under these conditions the part 23 of the drum is immovably held from turning. I have not described the remainder of the engine nor have I illustrated all of its parts inasmuch as aside from the drum and the parts hitherto described, its construction is well known and may be modified or replaced by other means for turning the crank shaft without in any way departing from my invention. The two ropes 19 and 20 are so attached to the drum that one end of each of them is connected to a small diameter portion of the part 23 thereof and is so wound on this part as to leave said drum at or immediately adjacent its portion of largest diameter. Moreover, these two ends of said ropes leave the drum in opposite directions, and when it is turned, one is paid out at a decreasing rate while the other is wound on the drum, likewise at a decreasing rate, so that the length of one of these ends delivered is exactly equal to the length of the other rope taken in. The second ends of each of the ropes 19 and 20 are connected to the ends of the part 22 of the drum, and when the rudder is in its mid position, are fully wound thereon so that revolution of the drum in either direction feeds off one of said ends at a uniform rate exactly equal to the rate at which the other is wound up. With this arrangement of parts and assuming that the hand wheel 31 is in position to permit of the operation of the engine by steam, the rudder holding pin 5 is placed to hold the rudder 1 from moving while the rudder 2 is of course free to move.

Since the two parts 22 and 23 of the drum are coupled, the admission of steam to the engine caused by operating either of the wheels 12 or 13, will, through the worm 33, turn the worm wheel 25 with the drum 21 and slowly pay out one end of the rope 19, while the other end is taken in more rapidly than said first end but at a decreasing rate of speed. At the same time one end of the rope 20 is taken in slowly at a uniform rate, while its other end is paid out more rapidly than its other end is drawn in but also at a decreasing rate. As a consequence one of the blocks 10 of one pair, as for example that connected to the ropes 6 and 7, is drawn toward the other at a rapid but decreasing rate when the rudder is being moved from its mid position and at the same time one of the blocks 10 of the ropes 8 and 9 is allowed to move away from the other at the same rate of speed, with the result that the rudder is at first moved at a high but diminishing speed and with small power until, when it approaches its hard over position and the ends of the ropes 19 and 20 attached to the part 23 of the drum are paying off or winding upon the small diameter portions thereof, the rudder is moved slowly, but with increased power; it being noted that this action is in accordance with the requirements necessary for the most satisfactory and efficient operation of both the rudder and the operating engine. It will be noted, moreover, that with this arrangement of parts there is absolutely no slack in any of the ropes at any time, since the amount paid out on one side of the drum is exactly equal to that taken in on the other side thereof. It is obvious that if it be desired to operate either of the rudders by hand, the hand wheel 31 may be so operated as to disconnect the parts 22 and 23 of the drum and connect the gear 30 to the shaft 32, whereupon the revolution of the shaft 18 by either of the steering wheels 12 and 13 causes turning of the said shaft 32 and gear 30 as well as of the gear 27 and the part 22 of the drum. As a result one end of the rope 19 may be wound up while the corresponding end of the rope 20 is paid out, both actions taking place at a uniform rate since the second ends of the rope are fixed to the part 23 of the drum which is held from turning by reason of the engagement of its worm wheel 25 with the worm 33. The rudder 2 is thus shifted from its mid position since the block 10 of the rope 7 is caused to move toward the block 10 on the end of the rope 6 while the opposite movement occurs between the blocks 10 on the ropes 8 and 9. Here as before there is no slacking in any of the ropes, although the rudder is moved in the common and well known manner. If it be desired to operate the rudder 1, the pin 5 is placed to hold the rudder 2 from turning, whereupon the ropes 7 and 9 with their blocks cannot move, though the ropes and blocks attached to the rudder 1 and its quadrant 3 are free to assume positions in accordance with the operation on the drum of the steering engine.

In that form of my invention shown in Fig 5, I have so modified the construction of the drum as to permanently connect its two parts; the invention being such that these as a whole may be either connected to or disconnected from the worm wheel 25 by means of a clutch 34, which, like the clutch 26 is designed to be thrown out to disconnect the drum 21 from the worm wheel 25 when the clutch 35 is thrown by the hand wheel 31 to connect the automatic shaft 32 with the gear 30. It will be noted, however, that the drum 21, illustrated in Figs. 3 to 5 inclusive, is of the double groove type, though if desired I may substitute for it a drum construction such as that shown in Figs. 6 and 7, where in place of a single double grooved part 23 there are two single grooved conical portions $23^a$ and $23^b$, each possessing two cylindrical portions concentric with the shaft 24 and each also having increasing and decreasing spiral portions continuous therewith. Rigidly connected to the part $23^a$ is a cylindrical part 22, the same as that shown in Fig. 4, and this is detachably connected to the worm wheel 25 by a suitable clutch such as the tooth device 37. The part $23^b$ is keyed to the shaft 24, though in this instance the worm wheel 25 is loose on said shaft while the gear 27 is feathered to said shaft. Under operating conditions this arrangement of parts operates in the same manner as has hitherto been described in connection with Figs. 3 and 4, although when it is desired to operate the rudder by hand, the turning of the wheel 31 disengages the parts 22 and $23^a$ from the worm wheel 25 so that the turning of the shaft 18 operates the parts 22, $23^a$ and $23^b$ of the drum through the automatic shaft 32, clutch 35, gears 30 and 27 and shaft 24.

In place of the rope rigging shown in Figs. 1 and 2, I may employ that shown in Fig. 11 and use therewith the form of differential drum shown in Fig. 12; this arrangement as before being designed for use with a combined hand and steam system. In such a case both ropes 19 and 20 have one end permanently attached to a suitable fixed structure at 38, from whence each rope passes through the two blocks 10 and is attached to a differential drum which may have the form shown at 23 in Fig. 4 or may, as shown in Fig. 12, consist of two single groove drums $23^a$ and $23^b$, connected together and detachably connected to the engine driven worm wheel 25 by a friction or other clutch 34, as described in connection with Fig. 5.

The operation of the system with this arrangement of parts is the same as heretofore described in connection with Figs. 3 and 4, except that the blocks 10 of each pair on the opposite sides of the vessel are moved toward or from each other at a decreasing or increasing rate owing to a pull which is exerted through one end only of the rope 19 or 20, as the case may be, where in the case first illustrated one end of the rope 19 for example, was paid out at a uniform rate and the other end was wound up at a variable rate. In this case one end of said rope is held fast while its other end is taken in or paid out at a rate depending upon the position of the rudder, which, however, is moved as before at a high speed but with small power adjacent its mid position, but with a maximum power and at a slow speed at or adjacent its hard over position.

The same type of engine and drum may be used with a system employing steam for the purpose of actuating the steering engine, in combination with a separate hand steering attachment, such as shown in Fig. 10. In this case as in Fig. 11, it will be understood that while but one side of the system has been shown, the other side thereof is an exact duplicate of it; there being a pair of separate hand steering wheels 39 and 40 while the rope 19 after passing over a suitable guiding sheave, passes successively through blocks 10 connected to the ends of the two ropes 6 and 7. Its end, however, instead of being attached to a fixed structure as in the case of Fig. 11, is connected to one end of a rope 42 coming from the hand steering wheel 40, and one end of a rope 43 coming from the steering wheel 39, is likewise connected to it at 44 after passing around a suitable guiding sheave 45. If in this case it be desired to use the rudder 1, the rudder 2 is held by its pin from moving, and the hand steering wheel 40 is left free to turn as is also the wheel 39. If the steam steering gear be used, both hand wheels 39 and 40 are lashed fast or are held in any other suitable manner. In such case the rope 19 causes operation of the rudder 1 in a manner precisely similar to that described in connection with Fig. 11. If however, it be desired to use the hand wheeel 40, the two drums 23$^a$ and 23$^b$ are left connected to the worm wheel 25 so that turning of said wheel may be caused for example to pull on the rope 42, which since the drum end of the rope 19 is immovably held with the drum, causes the pulley 10 at the end of the rope 6 to move toward the pulley 10 of the rope 7 in the manner heretofore described and likewise causes a corresponding opposite movement of the block 10 connected to the rope 8 (not shown) of the rudder 1, so that this latter is operated as desired.

It is obvious that the removal of the pin from the rudder 2 and the placing of it in the rudder 1 will render possible the operation of the rudder 2 by the hand wheel 39 as before described in connection with the rudder 1.

Another form of my invention in which the separate hand steering gear is employed in connection with an engine whose drum may be operated by steam only, is shown in Figs. 8 and 9, where the engine 11 is equipped with differential drums of the construction shown either in Figs. 3 or 6. In this case, however, one part of the rope 19, after passing through the block 10 on the end of the rope 7, passes around a sheave 45 and terminates on the drum of the hand steering wheel 39. A second part of said rope, after passing through the block 10 at the end of the rope 6, runs to the drum of the hand steering wheel 40, and the two parts of the rope 20 likewise each have one end connected to the drum of the steering engine and their second ends respectively connected to the drums of hand steering wheels 39 and 40. In this case the steering wheels are lashed fast when not in use, being held by beckets or otherwise so that the admission of steam to the engine cylinders operates either rudder in the customary manner heretofore described.

If it be desired to operate the rudder 1 by the hand wheel 40, the rudder 2 is immovably held by its pin and the hand wheel 39 is as before held from moving in any suitable manner. The turning of said hand wheel 40 then causes the blocks 10 attached to the ends of the ropes 6 and 8 to move as heretofore described so as to turn the rudder 1, while the remainder of the apparatus of the system is idle and held from moving, there being as in every case heretofore described, no slack rope in the system at any time. The rudder in this case, when operated by hand is actuated in the customary manner, $i.$ $e.$ without a variation in the operating power at any particular part of its movement although when used with the combined hand and steam mechanism shown in Figs. 3 to 7, inclusive, said hand mechanism is capable of differentially operating the rudder, since the differential drums are actuated. In any case, however, the operation of the steam steering engine causes the rudder to be actuated in the desired way without any variation in the tension of the ropes due to said operation.

It will be understood that while I have omitted all reference to the detail method of operation of the engine and its parts, these act in the well known manner and in themselves constitute no part of my invention.

It is to be noted that each of the drums employed on the power operated engines or machines for actuating the rudders has two conical portions placed base to base and that these portions have formed in them one or more cable grooves whose portions at the bases of said conical drum sections are connected directly together without the interposition of any relatively great length of groove concentric with the drum shaft; that is to say, a cable, after being wound up on one of the conical parts of the drum from its part of small diameter to its larger part, passes directly into the spiral path which is formed by the groove on the second conical surface of the drum and which decreases as to its distance from the drum shaft until it has reached the small diameter cylindrical portion of the drum concentric with said shaft.

It is to be understood that by the terms "rope" or "cable" as used by me, I refer to whatever form of flexible or other connecting means is employed to transmit power from the engine or steering wheels to the rudders, regardless of whether such means is in the form of a stranded metallic or other rope or cable or one or more chains or rods.

One important advantage of those particular systems of apparatus described above, which employ drums having conical portions merging into cylindrical portions, resides in the fact that if the controlling mechanism be operated too far in either direction, the rudder is brought to one of its hard over positions and thereafter the engine is permitted to run for a limited time without causing injury or strain to any of the parts, since the rope or ropes are paid out and taken in at a uniform rate, thus causing them to run through the blocks 10 without further tendency to move the rudder; it being understood of course that the drums and ropes are so designed as to permit of a certain amount of this over-travel.

In that form of my invention shown in Fig. 13, I employ a single engine 11 for operating the two rudders of a double ended boat as heretofore noted, although in this case said engine is equipped with a plain cylindrical drum having a pair of double grooves such as are shown in Fig. 3, though it may be made in two separated cylindrical parts each having a single groove as shown in Fig. 7. In such case, however, the rudders are so made as to be capable of dis-connection at will from their quadrants 3 and 4, and with this idea in view each rudder, while swinging free on the rudder post on which its quadrant is mounted, has keyed or otherwise rigidly fixed to it an arm 2ª which may at will be connected to its adjacent quadrant by means of a rudder pin 5. Thus if it should be desired to control the rudder 1 from the hand wheel 13, the pin 5 would be placed as shown in Fig. 9 to retain the rudder 2 in its mid position, thereby leaving the quadrant 4 free to swing independently of said rudder. At the same time a rudder pin 5 would be placed in the quadrant 3 to connect to it the arm 2ª of the rudder 1 so that movement of said latter quadrant is communicated to said rudder. If now the engine 11 be operated to wind up the rope 6ª and pay out the rope 8ª, the rudder 1 is moved through its quadrant 3 to one side of its mid position, while at the same time one of the ropes 7ª or 9ª is wound up and the other is paid out so that the quadrant 4 is caused to swing idly. It is obvious that by pinning fast the rudder 1 and freeing the quadrant 3 the vessel may be steered from the wheel 12 by connecting the rudder 2 to the quadrant 4 as above described.

While as heretofore noted, I preferably use a differential drum in operating those forms of my system shown in Figs. 10 and 11, it is obvious that a plain cylindrical drum may be employed if it is not desired to obtain the differential action of the rudders. In any case, however, those forms of my invention shown in Figs. 10, 11 and 13 may be operated by a single engine which would necessarily be equipped with a plain cylindrical drum for the system of Fig. 13 and could employ either a differential or a plain cylindrical drum in the systems of Figs. 10 and 11.

I claim:—

1. A new article of manufacture consisting of a drum having two conical portions arranged base to base and provided with cylindrical portions forming continuations of the small diameter parts of said conical portions; there being a groove or grooves formed in the said portions of the drum; one of said cylindrical portions being of greater length than the other; and having a part detachable at will from the remainder.

2. The combination with the two rudders of a double ended boat, of cables attached to said rudders; and a power actuated machine including a single winding drum to which said cables are connected, for operating the rudders; said machine including means for moving either of said rudders with greater force adjacent its hard over position than adjacent its mid position; with means whereby but one of the rudders is operated at a time.

3. The combination with the rudders of a double ended boat of cables connected to said rudders; and a machine including a single winding drum for actuating said rudders through said cables, said machine including means for moving either of the rudders with relatively small power and at a high speed adjacent its mid position and with a relatively greater power at a slower speed adjacent its hard over position; with means whereby but one of the rudders is operated at a time.

4. The combination with the rudders of a double ended boat of a single machine including a single winding drum for actuating either of said rudders at will; and means for connecting said rudders with said machine, the latter including a device for automatically applying a greater operating force to either of the rudders adjacent its hard over position than is applied to operate said rudder adjacent its mid position; with means whereby but one of the rudders is operated at a time.

5. The combination with the rudders of a double ended boat of a single machine including a single winding drum for actuating either of said rudders; and means for connecting said rudders with said machine, the latter including a device for automatically applying a greater operating force to either of the rudders adjacent its hard over positions than is applied to operate said rudder adjacent its mid position; with a hand operated device capable of directly actuating the rudders under predetermined conditions; and means whereby but one rudder is operated at a time.

6. The combination with the rudders of a double ended boat of actuating means therefor including cables connected to the rudders; and a machine including a single winding drum to which said cables are connected for actuating said rudders, the machine including a device for applying different amounts of operating force to either of the rudders depending upon its position, with means for maintaining the lengths of cables between itself and the rudders at all times constant regardless of the position of said rudders.

7. The combination with the rudders of a double ended boat for actuating means therefor including cables and a single differentially acting device for giving said rudders different speeds at different parts of their movement with means whereby but one of said rudders is operated at a time.

8. The combination with the rudders of a double ended boat of actuating means therefor including cables and a single differentially acting device for giving said rudders different speeds at different parts of their movement; said means for actuating said rudders including a differentially acting device for applying a greater moving force to said rudders when they are adjacent their hard over positions than when they are adjacent their mid positions with means whereby but one of said rudders is operated at a time.

9. The combination with the rudders of a double ended boat of ropes connected to said rudders; and a machine including a single winding drum for operating the rudders through the ropes; said machine including a winding drum having two conical portions placed base to base and provided with grooves on said portions for the reception of the ropes with means whereby but one of said rudders is operated at a time.

10. The combination with the rudders of a double ended boat of ropes connected to said rudders; and a machine including a single winding drum for operating the rudders through the ropes; said machine including a drum; a power actuated member; means for connecting said drum to said member at will; and means for actuating the drum by hand independently of the member; said drum having two conical portions placed base to base and two cylindrical portions; there being a groove or grooves formed on said cylindrical and conical portions for the reception of the ropes with means whereby but one of said rudders is operated at a time.

11. The combination with the rudders of a double ended boat of ropes connected to said rudders; and a machine for operating the rudders through the ropes; said machine including a winding drum having two conical portions placed base to base and two cylindrical portions of which one is of greater length than the other; two of the ropes being operative on the conical portions of the drum and the others being operative on the elongated cylindrical portion thereof.

12. The combination with two rudders of a double ended vessel of a single engine; a drum therefor; and means connecting the drum with both rudders, including means whereby but one rudder is operated at a time, the said drum being connected to operate whenever the engine is operated.

13. The combination with the two rudders of a double ended vessel; a single engine; ropes connecting the engine with the rudders having four ends terminating at said engine; the latter including a drum operative whenever the engine is operated for the reception of said ropes with means whereby but one of said rudders is operated at a time.

14. The combination with the two rudders of a double ended vessel of a quadrant for each rudder; and means whereby either quadrant may be connected to or detached from its rudder at will; ropes connected to said quadrants and a single engine having a drum receiving said ropes for operating either rudder at will through the ropes with means whereby but one of said rudders is operated at a time.

15. The combination of a vessel having two rudders; a movable member for each rudder; means for connecting either rudder to its member at will; a single rudder operating engine having a winding drum and ropes leading from said drum to the movable rudder members with means whereby but one of said rudders is operated at a time.

16. The combination of a vessel having two rudders; a movable member for each rudder; means for preventing movement of either rudder; means for connecting either rudder at will to its movable member; a single rudder operating engine; and a drum for said engine; and ropes for connecting said drum with the movable rudder members with means whereby but one of said rudders is operated at a time.

17. The combination of a boat having two rudders; a movable member for each rudder; means for attaching either rudder to its movable member; a single rudder operating engine having a winding drum provided with a plurality of grooves; and ropes connecting said rudders with said engine drum with means whereby but one of said rudders is operated at a time.

In testimony whereof, I have signed my name to this specification, in the presence of two subscribing witnesses.

WILLIAM S. WILKINSON.

Witnesses:
WILLIAM E. BRADLEY,
WM. A. BARR.